United States Patent [19]

Kemp

[11] Patent Number: 4,911,196
[45] Date of Patent: Mar. 27, 1990

[54] INLINE CHECK VALVE

[75] Inventor: Willard E. Kemp, Houston, Tex.

[73] Assignee: Kemp Development Corporation, Houston, Tex.

[21] Appl. No.: 293,065

[22] Filed: Jan. 3, 1989

[51] Int. Cl.$^4$ ............................................. F16K 15/00
[52] U.S. Cl. .................... 137/220; 137/454.2; 137/540; 137/543.15
[58] Field of Search .............. 137/220, 454.2, 540, 137/543.15, 543.19, 514.3

[56] References Cited

U.S. PATENT DOCUMENTS

| 2,170,478 | 8/1939 | Long et al. | 137/514.3 |
| 2,809,660 | 10/1957 | Becker | 137/514.3 |
| 3,092,133 | 6/1963 | Clark | 137/220 |
| 3,160,112 | 12/1964 | Flaton et al. | 137/543.15 X |
| 3,845,784 | 11/1974 | Sullivan | 137/543.15 X |
| 4,362,184 | 12/1982 | Marabeas | 137/543.19 X |
| 4,479,507 | 10/1984 | Nichols | 137/220 |
| 4,532,958 | 8/1985 | Napolitano | 137/454.2 |

FOREIGN PATENT DOCUMENTS

| 1044537 | 11/1958 | Fed. Rep. of Germany | 137/543.15 |
| 1817272 | 6/1970 | Fed. Rep. of Germany | 137/220 |
| 2471536 | 6/1981 | France | 137/543.19 |
| 2159248 | 11/1985 | United Kingdom | 137/540 |

OTHER PUBLICATIONS

Brochure (12 pages) of "Mokveld TKZ Check Valves" Published by Mokveld Valves, Inc., Houston, Texas.

Primary Examiner—Gerald A. Michalsky
Attorney, Agent, or Firm—Dodge Bush & Moseley

[57] ABSTRACT

An inline check valve (10) has a valve body (12) with an enlarged diameter valve chamber (14) in which a cage assembly (44) is mounted. Cage assembly (44) has a cylindrical body (48) fitted about the outlet flow passage (18) and projecting in unsupported cantilevered relation within the valve chamber (14). The free end portion (56) of body (48) mounted a piston check valve member (50) thereon for relative reciprocal movement between open and closed positions. Upon a reversal of fluid flow, the entire rear face for the check valve member (50) is exposed to fluid pressure from the outlet flow passage (18), and the check valve member (50) immediately moves to closed position under the influence of spring (86) and fluid pressure. Cage assembly (44) may be inserted within and removed from the inlet fluid passage (16) upon removal of the inlet seat (36) and retainer (42).

7 Claims, 2 Drawing Sheets

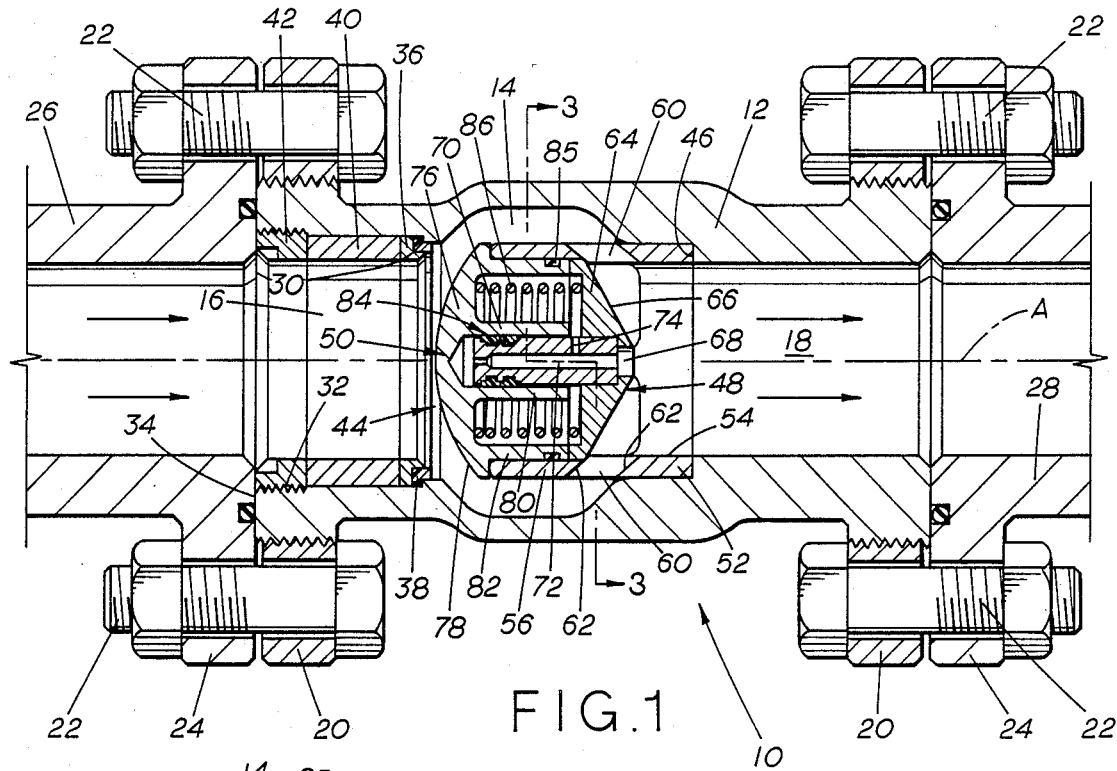
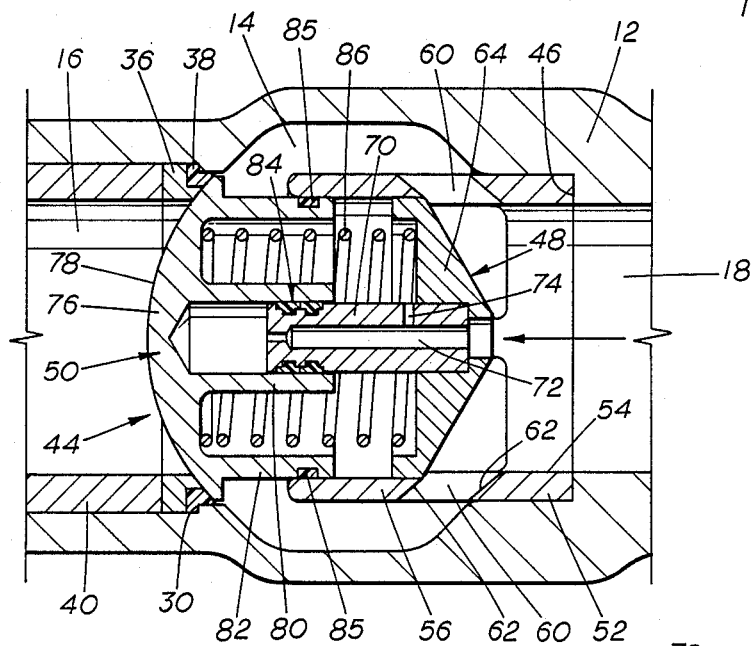
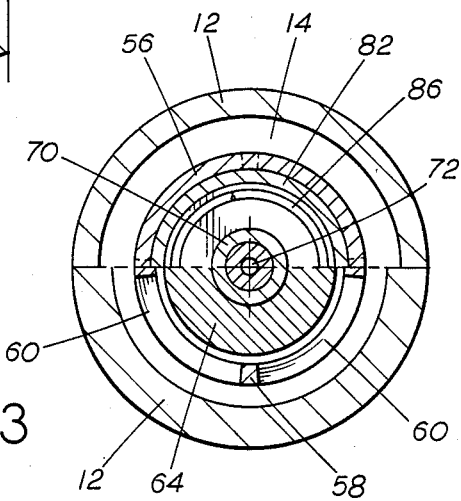
FIG.1
FIG.2
FIG.3

INLINE CHECK VALVE

BACKGROUND OF THE INVENTION

This invention relates to inline check valves and more particularly to an inline check valve positioned within an enlarged diameter valve chamber for directing fluid flow between axially aligned inlet and outlet flow passages with a minimum of turbulence.

Heretofore, inline check valves have been provided within an enlarged valve body in axial alignment with aligned inlet and outlet flow passages of the valve body. Normally a piston check valve member is mounted within the valve body for movement between seated closed position and an unseated open position with resilient spring means urging the piston check valve member to seated closed position. The piston check valve member is usually removable from the valve chamber upon removal of the annular seat about the inlet flow passage but the supporting structure, such as a cage, has normally not been removable from the inlet flow passage since the cage has been of a larger diameter.

Further, the supporting cage structure heretofore has included support ribs which extend radially outwardly from the check valve member into the valve chamber and into the normal flow stream through the valve. Such a radial projection of the ribs thus restricts normal fluid flow through the valve and oftentimes creates a turbulence in the flow stream. Normally the ribs are supported laterally by the valve body and the cage structure for the ribs oftentimes has a complex shape which is relatively difficult and costly to manufacture. Such an arrangement requires a relatively large valve chamber for receiving the ribs and supporting cage structure, and the smooth fluid flow between the inlet and outlet flow passages is interrupted by the cage structure to provide turbulence. In addition, the cage by having ribs extending radially beyond the piston valve member cannot be removed from the valve chamber upon removal of the inlet valve seat such as might be desirable for assembly of the valve or for repair.

SUMMARY OF THE INVENTION

The present invention is particularly directed to an inline check valve having a valve body with an enlarged diameter valve chamber and a generally cylindrical cage assembly structure mounted within the valve body chamber including a cage and check valve member mounted thereon which may be preassembled and inserted within the valve chamber through the inlet flow passage when the inlet seat is removed from the valve. The cage has one end secured within the valve body about the outlet flow passage and a free unrestrained end extending therefrom within the enlarged diameter valve chamber in a cantilevered manner. The check valve member is mounted on the extended free end of the cantilevered cage for movement between a seated closed position against the inlet seat for blocking fluid flow and an unseated open position permitting fluid flow.

Circumferentially spaced ribs extend axially in a direction parallel to the longitudinal axis of the flow passage between the ends of the cage but do not extend radially outwardly beyond the ends of the cage. Thus, the entire cage structure or assembly is of a diameter less than the diameter of the inlet seat so that it may be inserted within the valve chamber through the inlet flow passage upon removal of the inlet seat and its retainer. Such an arrangement likewise permits removal of the cage assembly from the inlet flow passage for repair or replacement.

Fluid flow through the inline check valve is from the inlet flow passage into an annular passage in the enlarged diameter valve chamber about the cage assembly, and then through the open spaces or arcuate slots between the ribs of the cage to the outlet flow passage. The cross-sectional area of the flow passage through the valve for the fluid stream is generally constant throughout its length thereby to minimize any turbulence of the fluid flowing through the check valve.

The cage assembly includes a generally cylindrical cage body having one end secured about the outlet flow passage and extending therefrom into the valve chamber in a cantilevered unsupported relation with an opposed free end connected to the fixed end by a plurality of ribs spaced about a circular path. A piston check valve member is mounted on the free end in oppose relation to an annular inlet seat for reciprocal movement between a seated closed position on the inlet seat blocking fluid flow and an unseated open portion permitting fluid flow. The piston check valve member has a rear face exposed to outlet fluid pressure upon a reversal of fluid flow and is urged thereby into closed seated position in a minimum of time thereby to provide a fast acting check valve upon a reversal of fluid flow through the valve.

It is an object of this invention to provide an inline check valve in which a cage assembly including a piston check valve member may be inserted within and removed from the valve chamber through the inlet flow passage.

It is a further object of this invention to provide an inline check valve which closes in a minimal time period upon a reversal of fluid flow in the valve.

An additional object of the invention is to provide an improved cage assembly for an enlarged diameter valve chamber with the cage assembly having a generally cylindrical cage body secured at one end about the outlet flow passage and projecting axially therefrom within the valve chamber to provide a free unsupported end adjacent the inlet seat for mounting a check valve member thereon.

Other objects, features and advantages of this invention will become more apparent after referring to the following specification and drawings.

BRIEF DESCRIPTION OF THE DRAWINGS

FIG. 1 is a longitudinal sectional view of an inline check valve in accordance with the present invention shown connected to inlet and outlet flow lines, the check valve member being illustrated in open unseated position to permit fluid flow through the valve;

FIG. 2 is a longitudinal sectional view similar to FIG. 1 but showing the check valve member in seated closed position blocking fluid flow through the valve;

FIG. 3 is an enlarged sectional taken generally along line 3—3 of FIG. 1;

DESCRIPTION OF THE INVENTION

Figure 4:
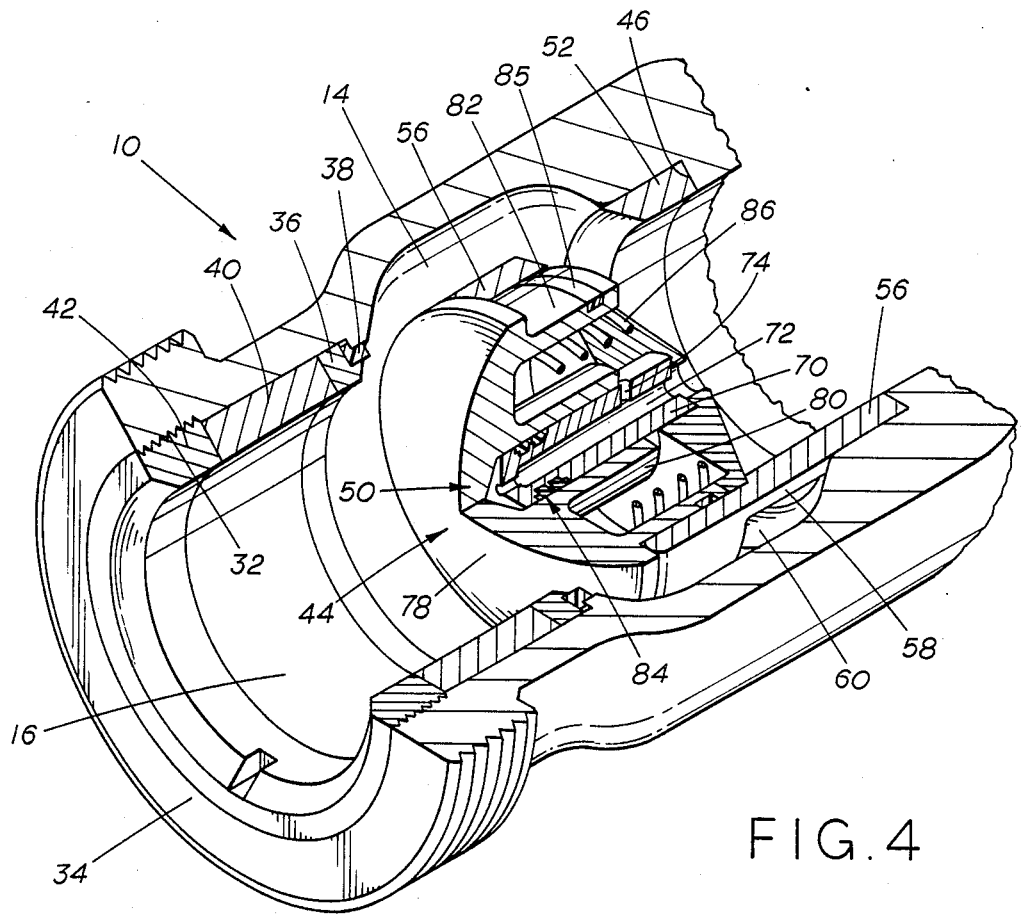
FIG. 4 is a perspective view with certain parts broken away of the cage assembly within the enlarged valve chamber.

Referring now to the drawings for better understanding of this invention, and more particularly to FIGS. 1 and 2, an inline check valve or check valve structure is shown generally at 10 having a valve body 12 defining an enlarged diameter valve chamber 14 in fluid communication with an inlet flow passage 16 and an axially aligned outlet flow passage 18 extending along a longitudinal axis A of valve 10. Check valve 10 as illustrated in Figure has flanges 20 on opposed ends of body 12 connected by suitable bolt and nut combinations 22 to aligned flanges 24 on inlet and outlet flow lines 26 and 28.

The inlet end portion of valve body 12 has an annular shoulder 30 therein adjacent valve chamber 14 and internal screw threads 32 at the inlet end 34 of valve body 12. An annular metal inlet seat 36 is mounted in abutting relation to shoulder 30 and has an elastomeric seal 38 adjacent valve chamber 14. A spacer sleeve 40 is positioned adjacent ring 36 and an internally threaded retainer ring 42 engages screw threads 32 for holding seat 36 in tight abutting relation against shoulder 30.

A cage or check valve assembly is indicated generally at 44 and forms an important part of this invention. Cage assembly 44 is of a generally cylindrical shape and has a longitudinal axis in alignment with the longitudinal axis A of inlet and outlet flow passages 16 and 18. An annular recess is provided in valve body 12 about outlet flow passage 18 adjacent chamber 14 and defines an annular shoulder 46. Cage assembly 44 includes a cage body indicated generally at 48 and a piston type check valve member generally indicated at 50 mounted on cage body 48 for reciprocal movement between an open position as shown in FIG. 1 permitting fluid flow, and a closed position as shown in FIG. 2 blocking fluid flow. Body 48 is of a cylindrical shape having an end securing ring 52 fitting in abutting relation against shoulder 46 within the recess about the outlet flow passage 18. The inner surface 54 of securing ring 52 forms a smooth continuation of flow passage 18.

Ring 52 is press fitted within the recess for securing cage assembly 44 within chamber 14 and projects therefrom within valve chamber 14 in unsupported cantilevered relation. An end support ring 56 on the projecting free end portion of cage body 48 is connected to securing ring 52 by four ribs 58 which define arcuate slots 60 spaced in a circular path about body 52. Arcuate slots 60 are defined by upstream and downstream sides 62 which taper or slant in a downstream direction from valve chamber 14 to outlet flow passage 18 for directing fluid flow from the annular flow passage in chamber 14 about cage assembly 44 to outlet flow passage 18.

Mounted adjacent ribs 58 and secured within cylindrical outer body 48 is a rear body member 64 having a generally conical rear face 66 with a central opening 68 at its apex for directing or diverting the fluid from slots 60 to outlet flow passage 18. Rear face 66 diverges from he adjacent upstream side 62 defining slots 60 to maintain the generally constant cross-sectional area of tee fluid flow path. Mounted within body member 64 is a cylindrically shaped guide 70 extending in a longitudinal direction aligned with longitudinal axis A. Guide 70 has a central bore 72 therethrough in fluid communication with central opening 68. A side port 74 leads from bore 72 to the interior of free end portion 56.

Mounted on the extending end of support ring or extending end portion 56 is piston check valve member 50. Check valve member 50 has a body 76 with a smooth outer face or surface 78 of a generally hemispherical shape and adapted to seal against elastomeric inlet seal 38. Body 76 has a pair of concentric projections 80 and 82 extending from the rear face of body 76. Inner concentric projection 80 receives guide 70 therein with bearing rings 84 therebetween. Outer concentric projection 82 is received within free end portion 56 with bearing ring 85 sealing therebetween. Thus, check valve member 50 is mounted on end portion 56 and guide 70 for reciprocal movement. A spring 86 is biased between the rear face of body member 64 and the rear face of body 76 to urge check valve member 50 continuously toward seated closed position.

In order to minimize turbulence, it is desirable to have a constant cross-sectional area along the flow path of the fluid stream. For this purpose, the cross-sectional area of the annular passage in valve chamber 14 about end portion 56 and the cross-sectional area of slots 60 are designed to be substantially the same as the cross-sectional area of inlet flow passage 16 and outlet flow passage 18.

In operation, with normal fluid flow from inlet flow line 26 to outlet flow line 28, fluid pressure against face 78 moves check valve member 50 to the position of FIG. 1 with fluid flowing about cage body 48 through arcuate slots 60 to outlet flow passage 18. The outer face 66 of rear body 64 forms a smooth continuation of adjacent tapered surfaces 62 defining slots 60 thereby to minimize turbulence.

Upon a reversal in fluid flow with fluid flowing from outlet flow passage 18 to inlet flow passage 16, fluid from outlet flow passage 18 is communicated through central bore 72 and side port 74 of guide 70 to the rear face of body 76 with the effective fluid pressure area being the entire area circumscribed by bearing ring 85.

Thus, a relatively large effective fluid pressure area is exposed immediately to fluid pressure from outlet flow passage 18 upon a reversal in fluid flow. As a result, body 76 under the bias of spring 86 moves rapidly to seated closed position with O-ring 38 engaging face 78 in tight sealing relation. Upon an increase in the fluid outlet pressure, the seating force exerted against seal 38 by face 78 likewise increases.

Figure 5:
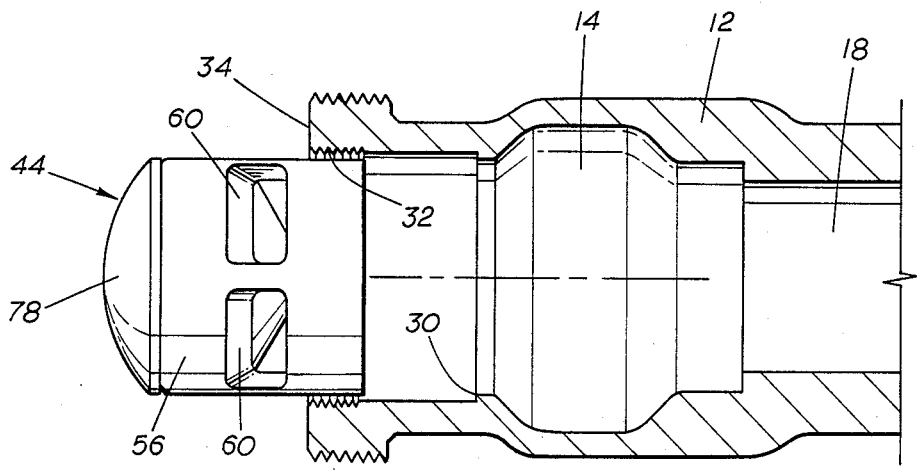
FIG. 5 is a longitudinal sectional view of the check valve comprising he present invention showing the inlet seat removed and the cage assembly partially removed from the valve chamber.

Referring particularly to FIG. 5, for the insertion or removal of cage assembly 44, end retainer ring 42 is unthreaded from screw threads 32, and sleeve 40 along with seat ring 36 are removed from valve body 12. Then, since the outer diameter of cage assembly 44 is less than the diameter of the body inlet passage, cage assembly 44 may be removed from or inserted within valve chamber 14.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A check valve structure adapted to be positioned within a fluid flow line along the longitudinal axis of the flow line; said check valve structure comprising:

a valve body having a valve chamber therein and opposed inlet and outlet flow passages of a uniform constant diameter in fluid communication with the valve chamber, said valve chamber being of an enlarged diameter substantially greater than the inlet and outlet flow passages;

a separate annular inlet seat member mounted in said inlet flow passage adjacent said valve chamber;

a check valve assembly mounted in said valve chamber in axial longitudinal alignment with said flow passages and including:

a cage body secured adjacent one end within said outlet flow passage adjacent said valve chamber to form a continuation of the outlet flow passage and extending axially within said valve chamber in a cantilevered relation to define an opposite free end;

a check valve member mounted on said opposite free end of said cage body for axial longitudinal movement between a seated closed position on said inlet seat blocking fluid flow between said inlet and outlet flow passages and an unseated open position permitting fluid flow between said inlet and outlet flow passages, said check valve member having a front face exposed to inlet fluid pressure during normal fluid flow and a rear face exposed to outlet fluid pressure upon a reversal in direction of fluid flow through the valve structure for effecting closing of the check valve member upon such reversal with the seating of said check valve member against said inlet seat increasing with an increase in outlet fluid pressure;

resilient means continuously urging said check valve member into seated closed position on said inlet seat; and means mounting said inlet seat member within said inlet flow passage for removal from said valve body;

said check valve assembly being of a diameter less than the diameter of said inlet seat and removable from said check valve chamber through said inlet flow passage upon removal of said inlet seat from said inlet flow passage.

2. A check valve structure as set forth in claim 1 wherein said cage body is of a generally cylindrical shape and has an end securing ring adjacent the outlet flow passage, and said valve body has an annular recess at the juncture of said fluid outlet passage and said valve chamber for receiving said end ring therein for mounting said cage body therein.

3. A check valve structure as set forth in claim 2 wherein said cage body has an inner peripheral surface adjacent said recess forming a smooth continuation of the fluid outlet passage and being of the same inner diameter as the diameter of let outlet flow passage.

4. A check valve structure as set forth in claim 1 wherein said valve body has an opening therein for said fluid inlet passage defining an internally threaded outer end portion and an outwardly facing shoulder generally adjacent said valve chamber, said inlet seat being a separate annular seat member removably fitting against said shoulder within said inlet flow passage, and an externally threaded seat retainer threaded within said threaded outer end portion and maintaining said inlet seat against said shoulder, said inlet seat being removable from said valve body upon removal of said seat retainer.

5. In a combination with a valve body having an enlarged diameter valve chamber therein and opposed inlet and outlet flow passages of a generally constant diameter in fluid communication with the valve chamber, and an annular valve seat mounted in said inlet flow passage adjacent said valve chamber;

an improved cage assembly mounted within said valve chamber in axial longitudinal alignment with the longitudinal axis of said inlet and outlet flow passages; said cage assembly comprising:

a cage body of a generally cylindrical shape having one end mounted about said outlet flow passage securing said cage body within said valve chamber, an opposed free end extending within said valve chamber in an unsupported cantilevered manner to define an annular flow passage between the cage body and the enlarged diameter valve chamber, and a plurality of connecting ribs between said ends defining a plurality of fluid flow slots therebetween for fluid flow from the valve chamber to the outlet flow passage; and a check valve member mounted on said free end of said cage body for movement between a seated closed position on said inlet seat and an unseated open position;

said cylindrical cage body having an end securing ring fitting within said valve body at the juncture of said fluid outlet passage and said valve chamber to mount said cage body therein, said cage body having an inner peripheral surface defined by said ring forming a continuation of the fluid outlet passage and being of the same inner diameter as the diameter of the outlet flow passage;

said cage assembly being of an outlet diameter throughout its length less than the outer diameter of said inlet seat, and said inlet seat being removable from said inlet flow passage to permit insertion and removal of said cage assembly.

6. In combination with a valve body having an enlarged diameter valve chamber therein and opposed inlet and outlet flow passages in fluid communication with the valve chamber, and a removable annular inlet seat mounted in said inlet flow passage adjacent said valve chamber;

an improved cage assembly mounted within said valve chamber in axial longitudinal alignment with the longitudinal axis of said inlet and outlet flow passages; said cage assembly comprising:

a cage body of a generally cylindrical shape having one end mounted about said outlet flow passage in supporting relation, an opposed free end extending within said valve chamber in an unsupported cantilevered manner, and a plurality of connecting ribs extending between said ends and defining fluid flow passage slots therebetween for fluid flowing between said inlet flow passage and said outlet flow passage;

a fluid flow diverter mounted within said cage adjacent said slots and exposed to fluid flowing through said slots from said valve chamber to said fluid outlet passage, said diverter having a generally conically shaped downstream surface facing said outlet flow passage and directing the flow of fluid from said valve chamber and slots to said outlet flow passage in a relatively smooth fluid stream with a minimum of turbulence; and a piston check valve member mounted on said free end of said cage body for movement between a seated closed position and unseated open positioned relative to said inlet seat;

said piston check valve member having a front face of a generally hemispherical surface exposed to inlet fluid pressure for directing fluid flow from said fluid inlet passage into said valve chamber about said cage body;

said piston check valve member having an opposed rear face and said conically shaped surface having an opening therethrough for directing fluid flow from said outlet flow passage to the rear face of said piston check valve upon a reversal in flow through said valve body for urging said piston check valve member to seated closed position in minimum time;

said cage being of a maximum outer diameter less than the outer diameter of said inlet seat and removable from said check valve chamber through said inlet flow passage upon removal of said inlet seat.

7. The combination as set forth in claim 6 wherein spring means are biased between said piston check valve member and said cage body for urging said piston check valve member to closed seated position on said inlet seat.

* * * * *